US 6,698,786 B2

(12) United States Patent
Witte et al.

(10) Patent No.: US 6,698,786 B2
(45) Date of Patent: Mar. 2, 2004

(54) TRACTOR WITH CARGO BOX AND REMOVABLE HITCH BALL

(75) Inventors: Benjamin Michael Witte, Fairbank, IA (US); James Arthur Nagorcka, Tarrington (AU)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/162,854

(22) Filed: Jun. 5, 2002

(65) Prior Publication Data

US 2002/0190496 A1 Dec. 19, 2002

Related U.S. Application Data (60) Provisional application No. 60/299,251, filed on Jun. 19, 2001.

(51) Int. Cl.[7] .................................................. B60D 1/06
(52) U.S. Cl. ..................... 280/495; 280/416.1; 280/511; 172/439
(58) Field of Search ................................. 280/503, 511, 280/425.2, 495, 416.2, 433, 455.1, 491.5; 172/439; 180/89.1, 89.12; 296/183

(56) References Cited

U.S. PATENT DOCUMENTS

| 3,698,740 A | * | 10/1972 | Chisholm et al. | ........ 280/491.4 |
| 3,893,713 A | * | 7/1975 | Ivy | ............................. 280/511 |
| 4,256,324 A | * | 3/1981 | Hamilton | ..................... 280/433 |
| 4,340,240 A | * | 7/1982 | Anderson | ................ 280/461.1 |
| 4,527,925 A | * | 7/1985 | Bauer et al. | ................. 403/143 |
| 5,016,898 A | * | 5/1991 | Works et al. | ................ 280/433 |
| 5,472,222 A | * | 12/1995 | Marcy | ........................ 280/433 |
| 6,095,545 A | * | 8/2000 | Bol et al. | ................. 280/491.1 |
| 6,502,654 B2 | * | 1/2003 | Witte et al. | ................. 180/89.1 |

FOREIGN PATENT DOCUMENTS

| BE | 493 603 A | 5/1950 |
| BE | 525 446 A | 1/1954 |
| CH | 191 712 A | 6/1937 |
| FR | 985 590 A | 7/1951 |
| FR | 2 526 390 A | 11/1983 |
| GB | 744 546 A | 2/1956 |

* cited by examiner

*Primary Examiner*—Lesley D. Morris
*Assistant Examiner*—Tony Winner (57) ABSTRACT

A tractor having a cargo box and an axle mounted hitch ball in which the hitch ball projects upward through an opening in the cargo box floor. This arrangement enables the ball to be used when the cargo box is mounted to the tractor. Furthermore, since the ball is mounted to the axle and not the cargo box, greater load carrying capacity is achieved and the hitch can be used when the box removed from the tractor.

2 Claims, 8 Drawing Sheets

TRACTOR WITH CARGO BOX AND REMOVABLE HITCH BALL

This application claims benefit of Provisional Application Ser. No. 60/299,251, filed Jun. 19, 2001.

FIELD OF THE INVENTION

The present invention relates to a tractor and in particular to a tractor having a cargo box and a removable hitch ball mounted above the rear axle thereof.

BACKGROUND OF THE INVENTION

An agricultural tractor is a traction machine intended primarily for off-road usage and designed primarily to supply power to implements. An agricultural tractor propels itself and provides a force in the direction of travel and may provide mechanical, hydraulic and/or electrical power to implements to enable them to perform their intended functions. A typical agricultural tractor however does not have provision for carrying materials or other cargo. A utility transport tractor is a specialty type of agricultural tractor that combines the primary function of an agricultural tractor described above with the capability to transport materials. Configurations may include cargo boxes or tanks for transport of materials.

As used herein the term "tractor" refers to a traction machine intended primarily for off-road use and designed to supply power to an implement. However, it is not limited to tractors solely for agricultural use but tractors that are also used in other contexts, such as in grounds care, golf course maintenance, park maintenance, forestry service, etc.

SUMMARY OF THE INVENTION

The tractor of the present invention is similar in configuration to an agricultural tractor, having larger rear drive wheels. However, the operator's station is moved forward of the rear axle and a cargo box, preferably a dump box, is mounted to the tractor behind the operator's station and above the rear axle. A standard three-point hitch extends rearward from the rear axle, as does a draw bar for towing implements. To provide further utility, a hitch ball is removably mounted above the rear axle of the tractor to enable a portion of the towed load to be transmitted onto the tractor chassis. By mounting the hitch ball above the rear axle as opposed to mounting the hitch ball at the end of the draw bar, a closer coupling of the tractor and trailer is achieved, providing improved maneuverability.

Since both the hitch ball and the cargo box are mounted above the axle, the cargo box is provided with an opening in the floor through which the hitch ball extends. Furthermore, the hitch ball is removably mounted to the tractor so that it can be removed when not in use. A cover closes the opening in the cargo box floor when the hitch ball is not in use. The cargo box is removably mounted to the tractor. When removed, the hitch ball remains available for use as it is separately mounted to the tractor and not mounted through the cargo box.

DESCRIPTION OF THE PREFERRED EMBODIMENT

Figure 1:
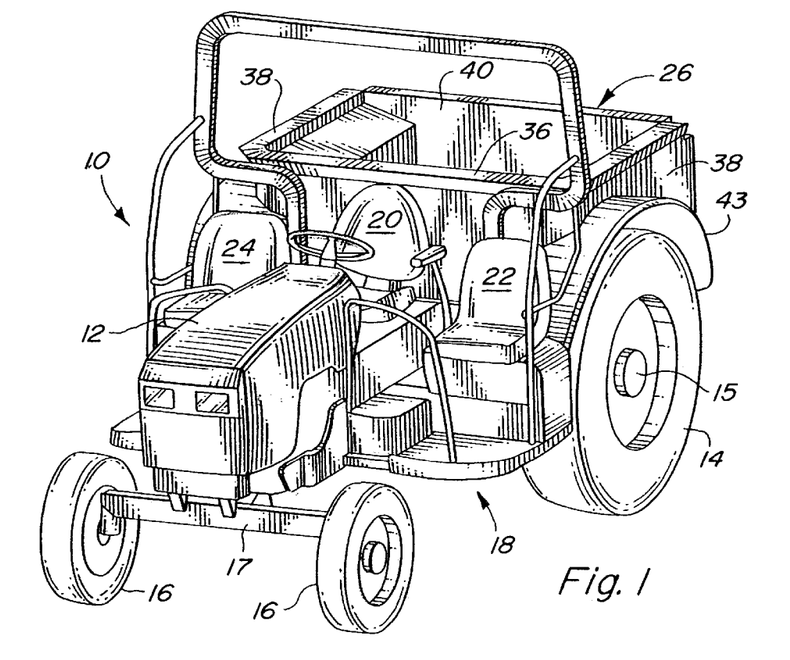
FIG. 1 is a perspective view of the tractor of the present invention.
Figure 2:
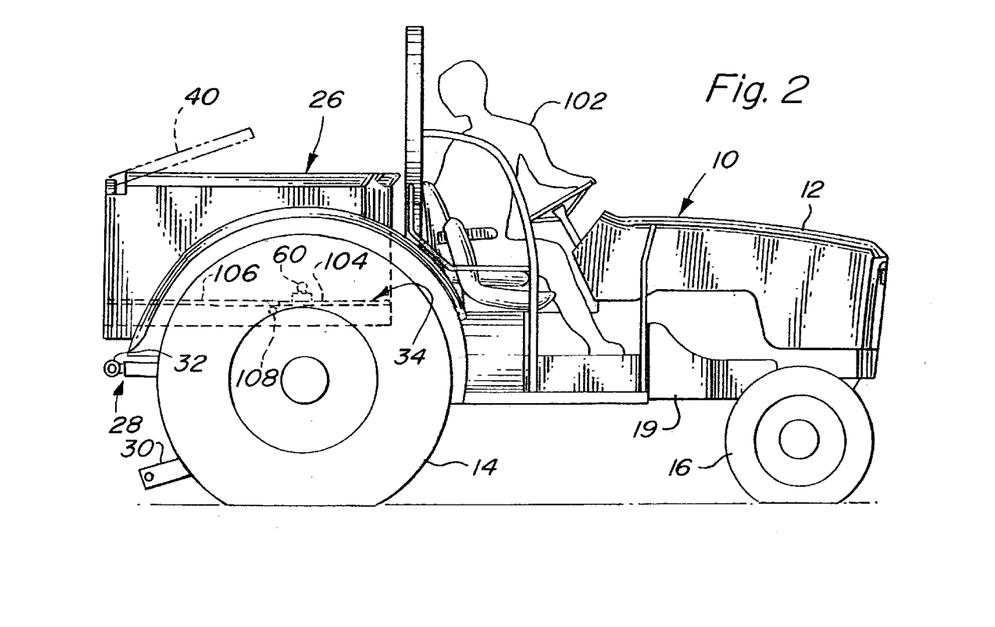
FIG. 2 is a side view of the tractor of the present invention.

With reference to FIG. 1, the tractor of the present invention is shown and designated generally at 10. The tractor 10 has a front hood 12 covering an engine 13, FIG. 3 The tractor further includes rear drive wheels 14 on a rear axle 15 and front wheels 16 on a front axle 17, all part of the tractor chassis 19. The front wheels 16 can be driven or non-driven. An operator's station 18 is located forward of the rear wheels and includes a center operator's seat 20 and left and right passenger seats 22, 24. A cargo box 26 is located rearward of the operator's station 18 and generally above the rear axle 15. A three point hitch 28, FIG. 2, is mounted behind the rear axle and beneath the cargo box 26. The three point hitch includes a pair of draft links 30 and an upper link 32.

The cargo box 26 has a generally horizontal floor 34, an upright front wall 36, left and right side walls 38 and a tailgate 40. The cargo box side walls form wheel wells for the rear wheels with a portion of the cargo box being disposed above each rear wheel. Fenders 43 are attached to the tractor chassis and are shaped to partially fit within the cargo box wheel wells. The cargo box also has a pair of side frame rails 108.

Figure 3:
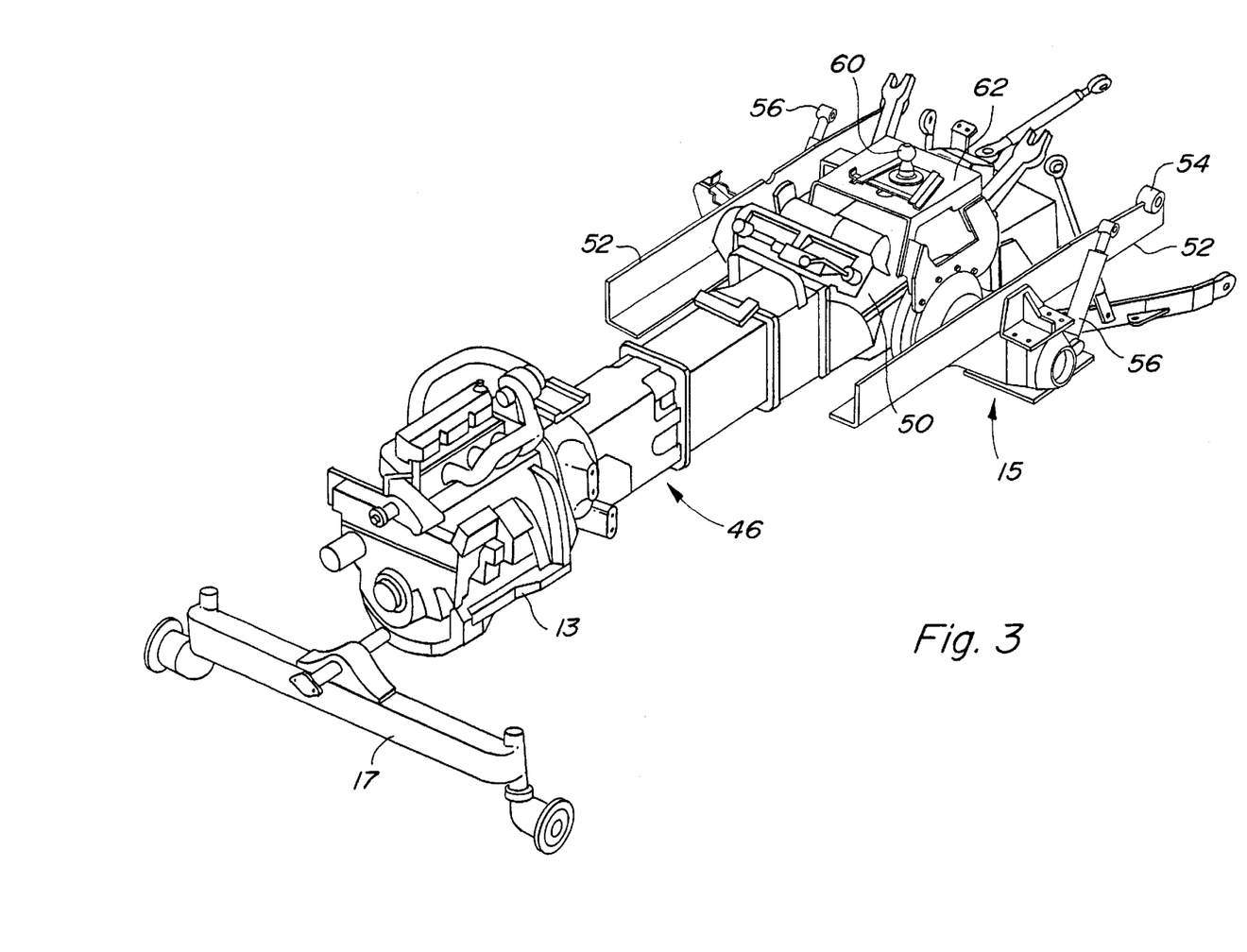
FIG. 3 is a perspective view of the power train portion of the tractor chassis.
Figure 4:
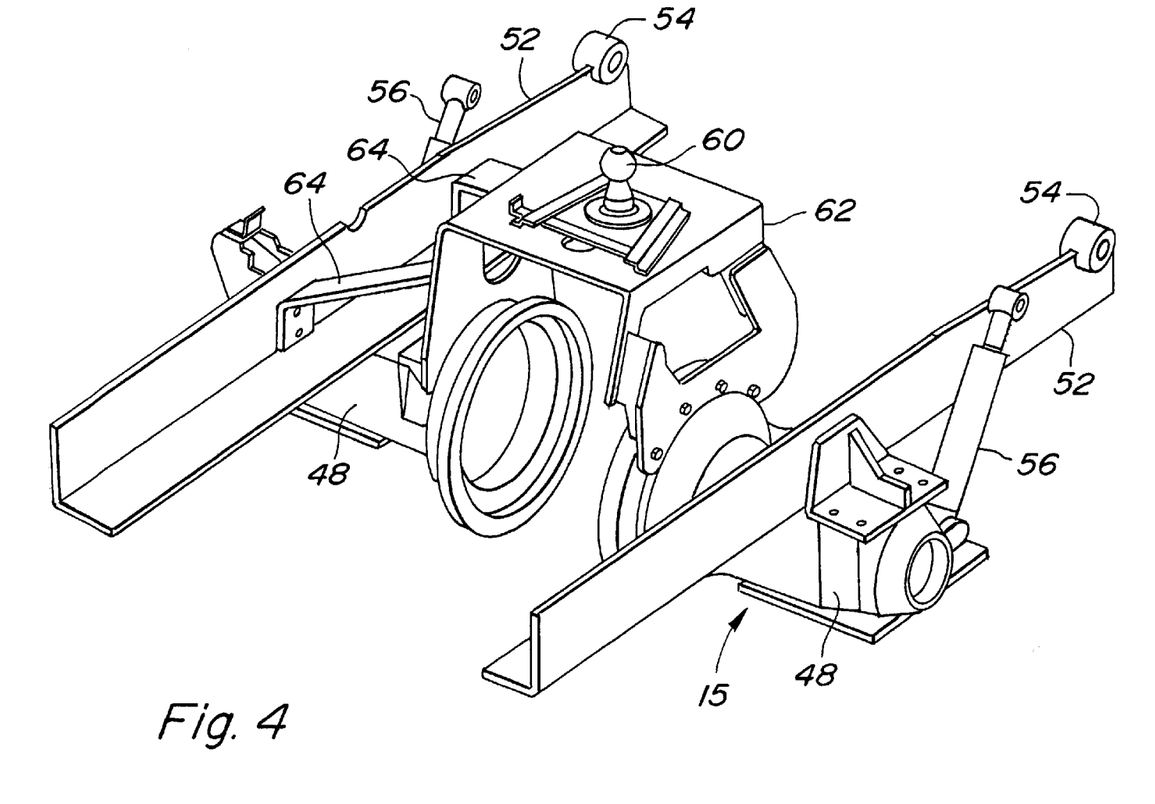
FIG. 4 is a fragmentary perspective view of the rear axle and hitch ball mounting structure.

The powertrain portion of the chassis 19 is shown in greater detail in FIG. 3. There the engine 13 is shown together with a transmission 46 leading to the rear drive axle 15. The rear drive axle includes left and right axle housings 48 as shown in FIG. 4 and a central differential housing 50 shown in FIG. 3. The chassis further includes frame rails 52 that are used primarily to mount and support the cargo box 26. The cargo box is pivotally mounted at the mounting bosses 54 at the rear of the frame rails 52. Lift cylinders 56 extend from the axle housings 48 to the cargo box and are extendable to tilt the cargo box to a raised dump position.

Figure 6:
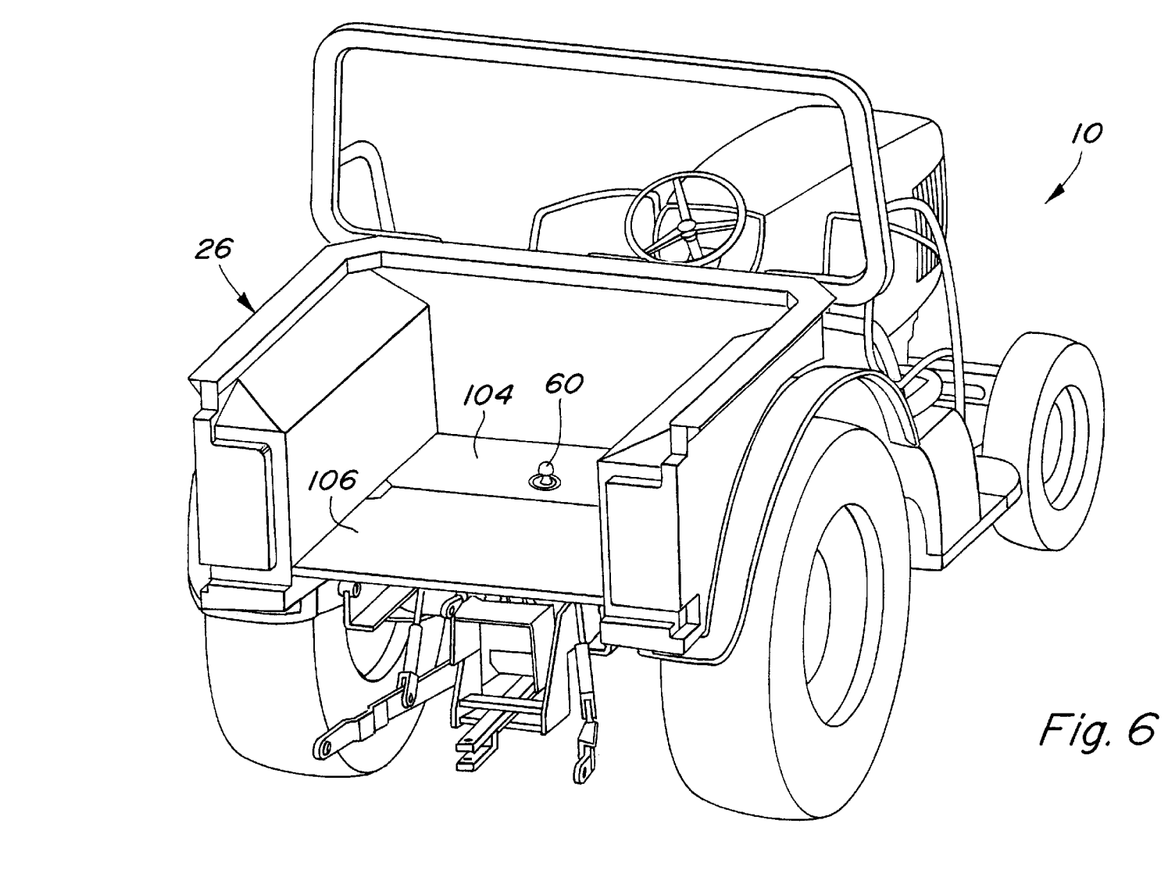
FIG. 6 is a rear perspective view similar to FIG. 5 with the cargo box attached to the tractor.

A hitch ball 60 is mounted to and above the axle 15 through a mounting bracket 62 coupled to each of the left and right axle housings 48. A pair of laterally extending braces 64 further couples the bracket 62 to one frame rail 52. The hitch ball 60 is removably mounted to the bracket 62 as described below. When the hitch ball is mounted to the bracket and the cargo box 26 is also mounted, the hitch ball 60 extends through an opening in the cargo box floor as shown in FIGS. 2 and 6. By extending through the cargo box floor, the hitch ball 60 can be mounted directly to the chassis and still be available for use with the cargo box 26 attached to the vehicle. This provides greater load carrying capacity with the ball mounted to the chassis then if the ball is mounted to the cargo box. Furthermore, the hitch ball is available during time periods when the cargo box is removed from the tractor.

Figure 5:
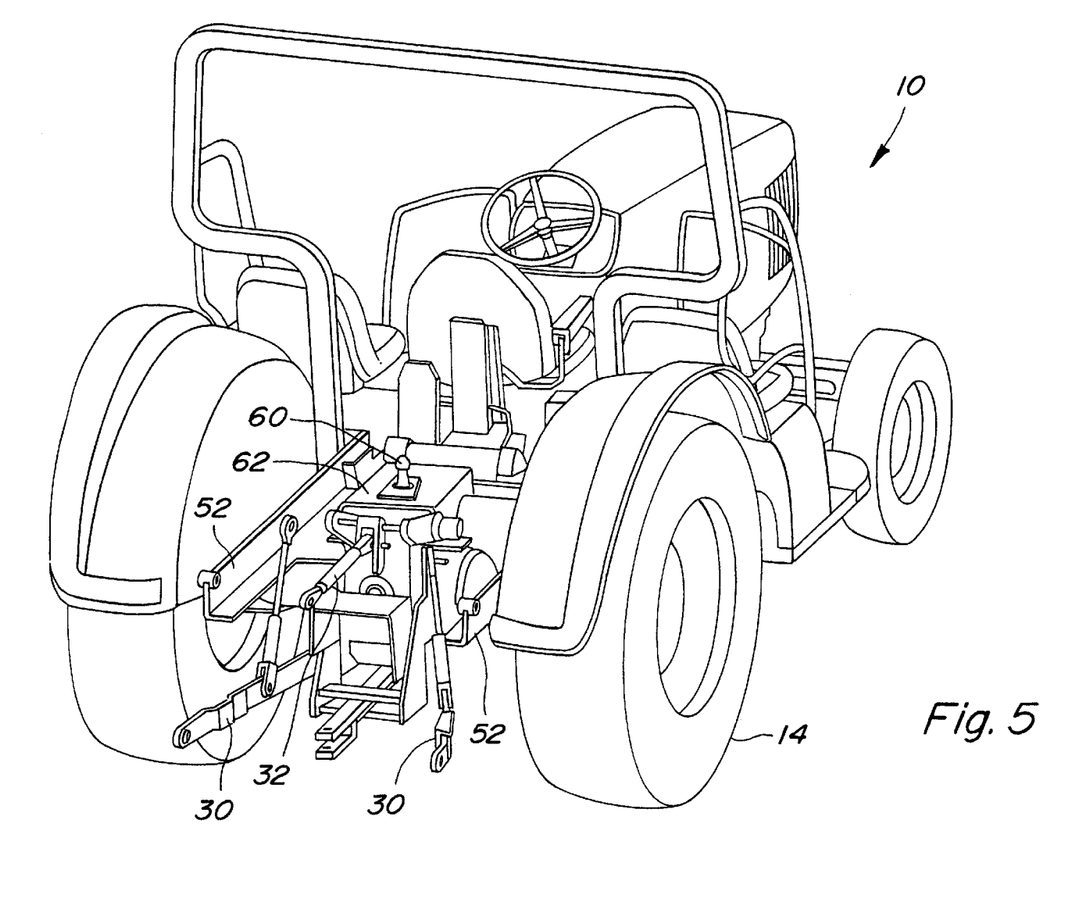
FIG. 5 is a rear perspective view of the tractor with the cargo box removed.
Figures 7, 8:
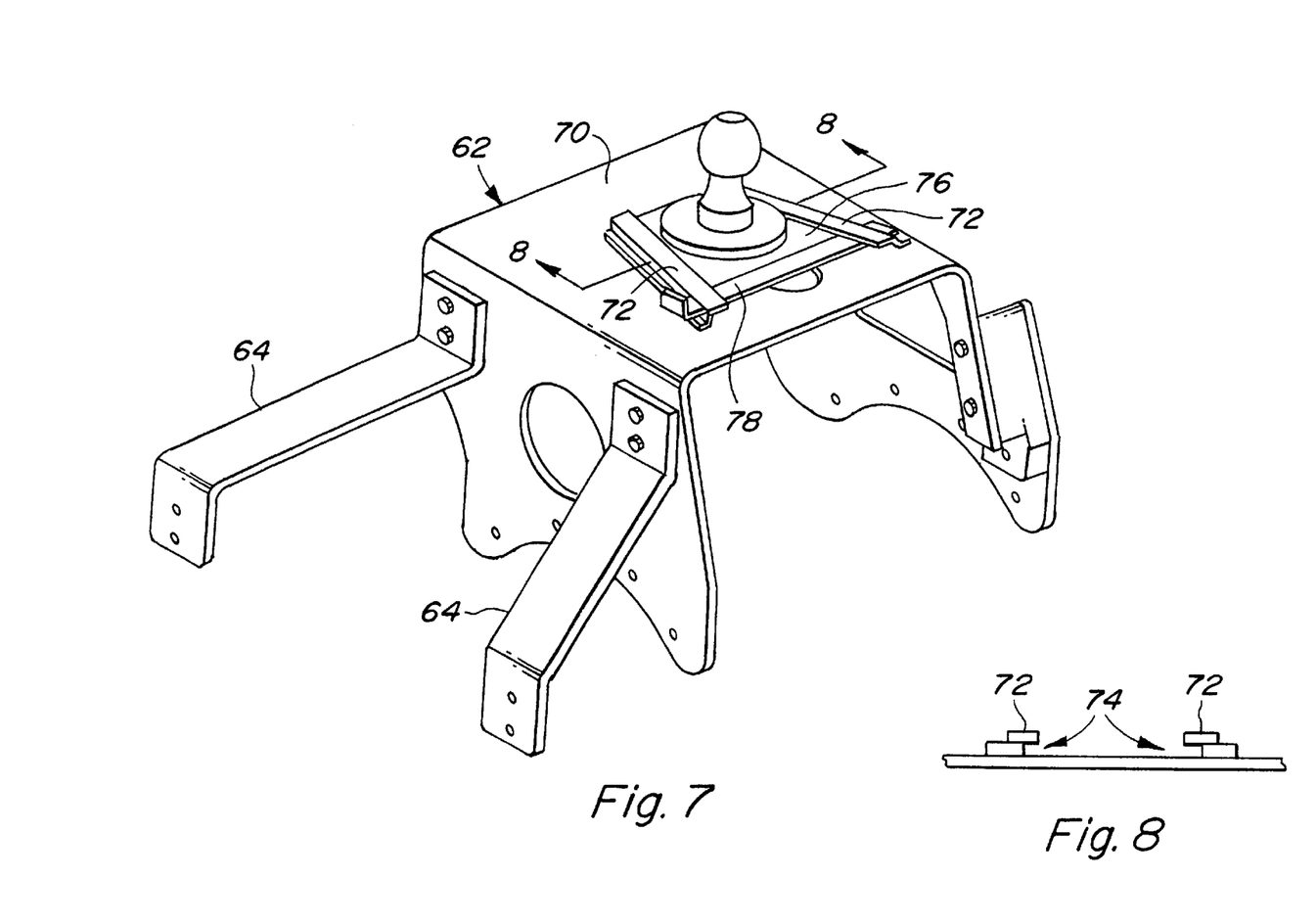
FIG. 7 is a perspective view of the hitch ball mounting bracket.
FIG. 8 is a sectional view as seen from substantially the line 8—8 through the hitch ball mounting bracket with the ball removed.

With reference to FIGS. 7 and 8, the removable mounting of the hitch ball 60 is shown in greater detail. The top plate 70 of the bracket 62 has left and right weldments 72 welded thereto. The weldments 72 each consist of two metal strips welded together to the top plate 70. The weldments form channels 74 that receive opposite edges of a base plate 76 to which the hitch ball 60 is fixed. The weldments 72 taper toward one another in one direction forming a wedge fitting for the base plate 76. A catch strap 78 is inserted across the two channels 74 to trap the base plate 76 therein. In FIG. 4, the weldments taper toward the rear of the tractor while in FIG. 5 the weldments taper toward the front of the tractor. Either direction can be used.

Figure 9:
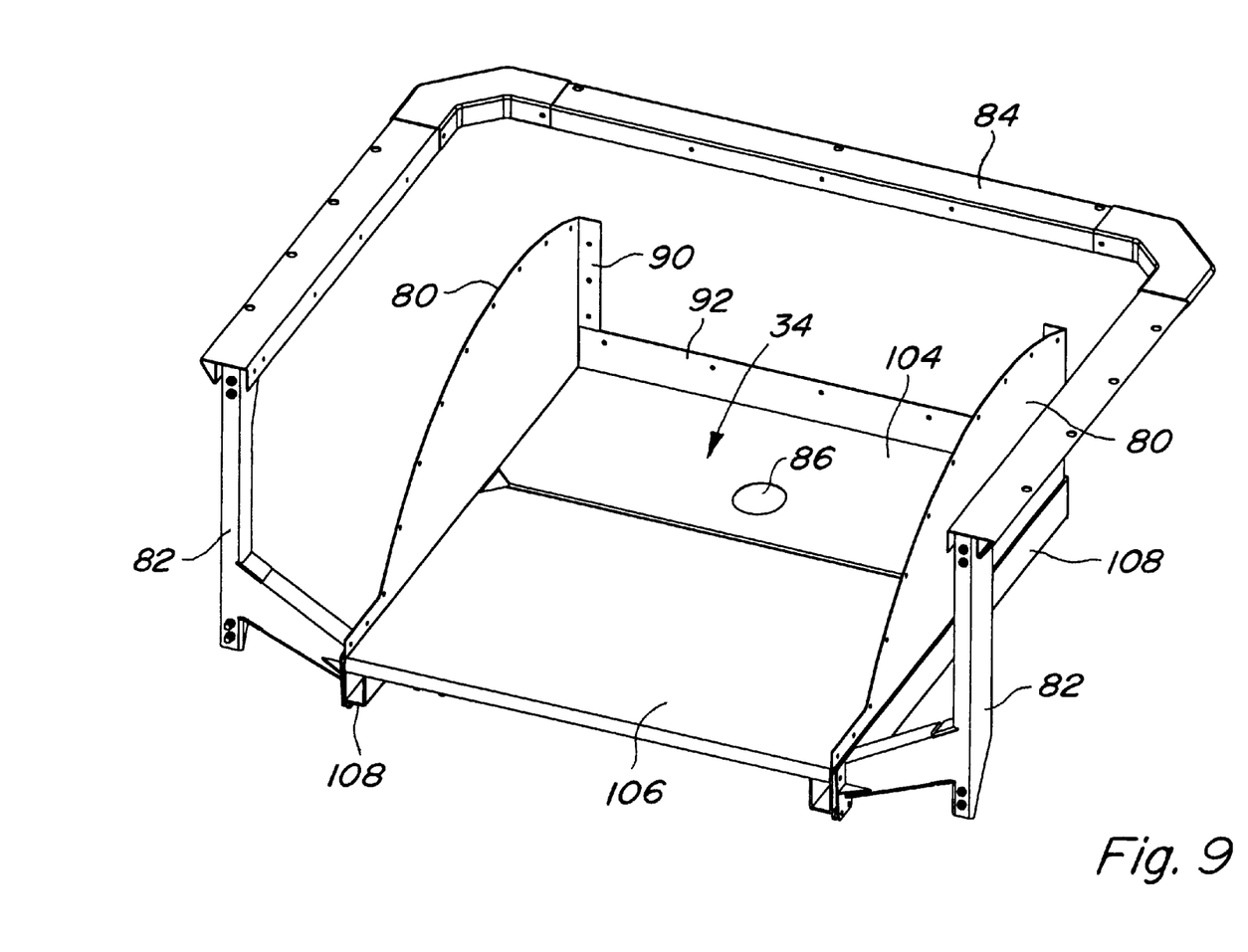
FIG. 9 is a perspective view of the steel structure of the cargo box.
Figure 10:
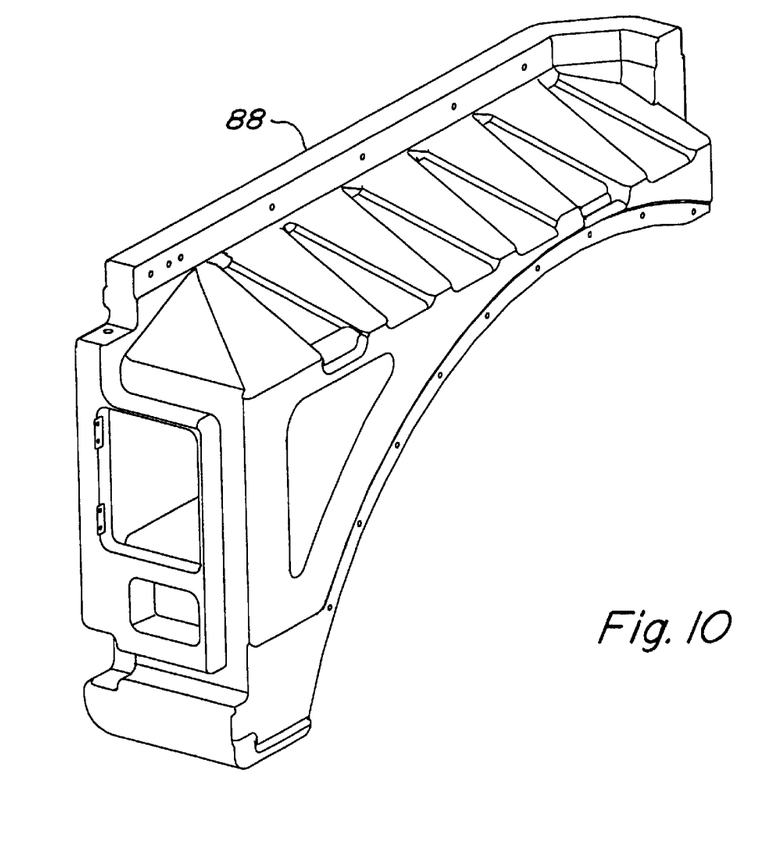
FIG. 10 is a perspective view of the left side molded plastic side panel for the cargo box.

With reference to FIG. 9, the steel components of the cargo box are shown. The floor 34 and lower portions 80 of the two side walls are made of steel. The steel components also include the cargo box frame rails 108, side brackets 82 and an upper frame 84 the top of the side and front walls. A cover 86 is placed in the opening in the cargo box floor that provides access for the hitch ball 60. An upper portion 88 of the box left side wall is shown in FIG. 10. The upper portion 88 is a plastic molded body that is bolted to the lower portion 88 of the side wall as well as the upper frame 84. The right side upper panel 88 is similarly constructed. The front wall 36 is also a plastic molded panel that is bolted to the in-turned flanges 90 of the side wall lower portions, to the up-turned front flange 92 on the bottom of the floor 34 and to the upper frame 84. By constructing the cargo box of both plastic and metal components, the overall weight of the cargo box can be reduced while still providing high strength load carrying structure of the cargo box.

Having described the preferred embodiment, it will become apparent that various modifications can be made without departing from the scope of the invention as defined in the accompanying claims.

What is claimed is:

1. A tractor comprising:

a chassis including front and rear axles, the rear axle being a drive axle having a pair of drive wheels attached thereto;

an operator's station having a seat for an operator;

a three point hitch with links extending rearward beyond the rear axle; and a hitch ball for attachment of a trailer to the tractor, the hitch ball being removably mounted above the rear axle, wherein the hitch ball is fixed to a plate member and the tractor further comprises a pair of facing channels having an open end that receive opposite edges of the plate member to removably mount the plate and hitch ball to the tractor.

2. The tractor as defined by claim 1 further comprising a catch to close the open end of the channels to trap the plate member therein.

* * * * *